(No Model.)
H. D. STREATOR.
TOBACCO MOISTENING CASE.
No. 474,424. Patented May 10, 1892.
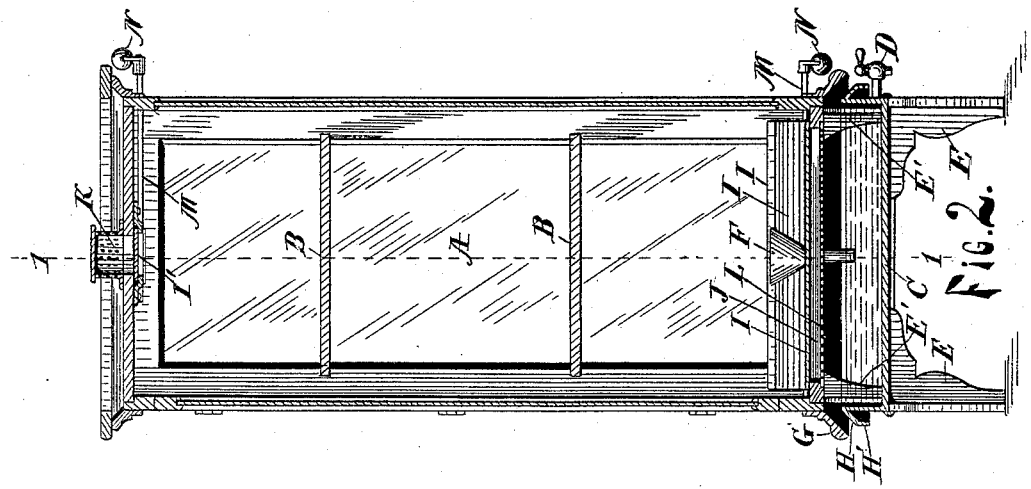
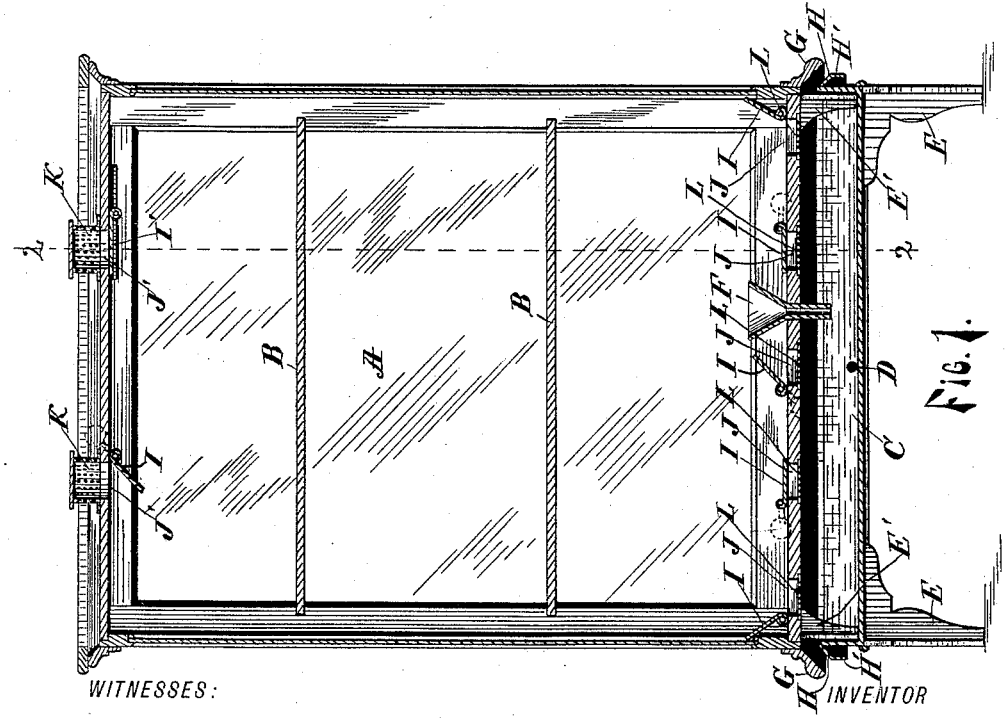
WITNESSES:
Robert R. Coburn
Lois Moulton
INVENTOR
Henry D. Streator
BY
Luther V. Moulton
ATTORNEY.

UNITED STATES PATENT OFFICE.

HENRY D. STREATOR, OF KALAMAZOO, MICHIGAN.

TOBACCO-MOISTENING CASE.

SPECIFICATION forming part of Letters Patent No. 474,424, dated May 10, 1892.

Application filed December 21, 1891. Serial No. 415,714. (No model.)

*To all whom it may concern:*

Be it known that I, HENRY D. STREATOR, a citizen of the United States, residing at Kalamazoo, in the county of Kalamazoo and State of Michigan, have invented certain new and useful Improvements in Cases for Preserving Merchandise in Moist Condition; and I do hereby declare the following to be a full, clear, and exact description of the invention, such as will enable others skilled in the art to which it appertains to make and use the same.

My invention relates to improvements in cases for preserving cigars, dried fruits, or other merchandise in a moist condition; and its object is to provide a complete and ventilated case when detached from the water-tray, to simplify the construction of the same, and to keep insects out of the water-tray, and to provide a finish to hide the air-opening between the tray and the case, and to provide the same with certain new and useful features hereinafter more fully described, and particularly pointed out in the claims, reference being had to the accompanying drawings, in which—

Figure 1 is a longitudinal vertical section on the line 1 1 of Fig. 2, and Fig. 2 a transverse vertical section on the line 2 2 of Fig. 1.

Like letters refer to like parts in all of the figures.

A represents any suitable case or receptacle to contain the merchandise, having shelves B to support the same. This case may have glass sides for a show-case or otherwise and may be of any convenient size or proportions. In the bottom and top of said case are two series of openings J and J', which openings are provided with valves I I' to partially or wholly close the same to regulate the air-currents through said case. The valves I are secured to rods M, journaled in the case and projecting outside the same. Said rods are each provided with a counter-balance N, which serves to hold the valves in position when partially open and as a handle to turn said rods. Slide-valves I', Fig. 2, may be provided at the top to save room, if desirable. Over the upper openings J' are short cylinders K, closed at the top and perforated at the sides to exclude dust and insects and permit air to escape, and below the bottom openings and attached to the bottom of the case are other screens L, also to keep out dust or insects and to admit air to the case. Beneath said case A is a shallow tray C to contain water, which is supplied to the same through a funnel F, inserted in the bottom of the case A, and said tray is also provided with a cock D to remove the water when desirable. Said tray is provided with legs E to raise it from the floor, so that a suitable vessel may be placed under the cock D to receive the water. The case A is also provided with legs E', which rest in the respective corners of the tray C and support said case a short distance above said tray to permit the air to pass over the water, and thence upward through the openings J into the case.

Surrounding and attached to the lower end of the case A is a molding or flange G, which is inclined outward and downward over the opening between the case and tray. This prevents air-currents, dust, and flying insects from entering this opening, and to the upper edge of the tray and surrounding the same is attached an outwardly and downwardly inclined flange H, substantially parallel to the inner surface of the molding G, and to the lower edge of said flange H is attached a vertical curtain H'. This flange and curtain and flange serve to prevent ants, worms, or other creeping things from passing up the sides of the tray and into the same. These flanges and curtain also serve to form a suitable finish and hide the opening between the case and tray, and in conjunction with the same constitute the principal features of my invention. By this construction I am able to remove the case from the tray and use it separately as a dry ventilated chamber without change in its form or arrangement. I also provide convenient means for manipulating the valves from the outside of the case.

What I claim is—

1. The combination of a tray, a case supported above the same, an air-passage between said tray and case, air-passages in the bottom and upper part of said case, and a molding attached to said case and projecting downward and outward over said passage between the tray and case, substantially as described.

2. The combination of a tray, a case supported above the same, an air-passage between said tray and case, air-passages in the bottom and upper part of said case, and outwardly and downwardly inclined flanges attached to said case and tray above and below said passage between said case and tray, substantially as described.

3. The combination of a tray having an outwardly and downwardly inclined flange around its upper edge and a detached case having legs resting in each corner of said tray and supporting said case above the same, leaving an air-passage between said case and tray, an outwardly and downwardly projecting flange attached to the lower end of said case, and air-passages in the bottom of said case and near the top of the same, substantially as described.

In testimony whereof I affix my signature in presence of two witnesses.

HENRY D. STREATOR.

Witnesses:
JAMES N. STEARNS,
ALLAN M. STEARNS.